Patented Oct. 14, 1941

2,258,671

UNITED STATES PATENT OFFICE 2,258,671

REFINING OF FAT-SOLUBLE VITAMIN-CONTAINING MATERIALS

Loran O. Buxton, Belleville, N. J., assignor to National Oil Products Company, Harrison, N. J., a corporation of New Jersey No Drawing. Application January 27, 1940, Serial No. 315,926

13 Claims. (Cl. 260—420)

This invention relates to the refining of fat-soluble vitamin-containing materials, more particularly to the removal of undesirable tastes and odors from fat-soluble vitamin-containing oils and concentrates.

As is well known, fish liver oils are an excellent source of both vitamins A and D; moreover, saponification of fish liver oils and extraction of the unsaponifiable material therefrom yields fat-soluble vitamin concentrates which have found a wide variety of uses. While such products are eminently satisfactory for many purposes, they generally possess the undesirable taste and odor normally associated with products of fish origin. Fat-soluble vitamin-containing materials derived from sources other than of a fish origin also may possess undesirable tastes and odors. Many attempts have been made in an endeavor to improve the taste and odor of fat-soluble vitamin-containing materials objectionable in these respects. For example, an alkali refining method has been employed for improving the tastes and odors of vitamin oils; in this method an alkali soap is prepared in the presence of the oil and then removed, the soap tending to carry with it some of the objectionable taste and odor. However, this method possesses many disadvantages, among them being that the oil becomes less stable when treated in this manner; furthermore, the odor and taste of the oil are not improved as much as might be desired. Another method commonly employed for improving the taste and odor of vitamin oils and concentrates involves passing steam through the heated oil or concentrate at a reduced pressure; while this method effects some deodorization, the deodorization is in most cases merely temporary, and, furthermore, this process removes only objectionable constituents of a volatile nature.

It has frequently been proposed to improve the taste and odor of fat-soluble vitamin-containing materials objectionable in these respects by incorporating suitable amounts of sweeteners such as sugars, molasses and like products. Such proposals, however, have not been successful because it has been found that the sweeteners do not effectively mask the undesirable taste and odor of the fat-soluble vitamin-containing materials; as a matter of fact, the final taste sensation produced upon ingesting fat-soluble vitamin-containing materials having sweeteners incorporated therein is very unpleasant because of the rapid transition from the relatively sweet taste of the sweetener to the characteristic fishy taste of the vitamin-containing materials.

It is an object of this invention to provide substantially odorless and tasteless fat-soluble vitamin-containing materials.

It is another object of this invention to provide a process for improving the taste and odor of fat-soluble vitamin-containing materials having objectionable tastes and odors.

I have found that the undesirable tastes and odors of fat-soluble vitamin-containing materials objectionable in these respects may be substantially completely removed by heating such fat-soluble vitamin-containing materials with a sugar at temperatures between about 100° C. and about 200° C., preferably between about 160° C. and about 180° C. The fat-soluble vitamin-containing material may be treated in accordance with my invention by mixing the material with a sugar and heating the mixture at temperatures between about 100° C. and about 200° C. in an open vessel; preferably, however, the material is mixed with the sugar and the mixture heated to the desired temperature in the presence of an inert gas and at a reduced pressure in order to minimize destruction of the vitamins and to assist the removal of odoriferous substances. The preferred embodiment of my invention involves heating a fat-soluble vitamin-containing material having an objectionable taste and odor with an aqueous sugar sirup at temperatures between about 160° C. and about 180° C. in an inert gas atmosphere and at a reduced pressure, since under these conditions optimum results are obtained. The refining process of my invention may be combined with other refining processes for improving the character of fat-soluble vitamin-containing materials; thus, for example, these materials may be treated with a sugar in accordance with my invention and the material then contacted with decolorizing carbon in order to obtain a light-colored product. When the refining treatments carried out in accordance with my invention are substantially complete, the fat-soluble vitamin-containing material may be separated from the sugar in any suitable manner and processed as desired. It will be found that in every case the resulting products possess substantially no undesirable tastes or odors and hence are eminently suitable for practically all purposes, particularly for human consumption; moreover, the vitamin potencies of the materials refined are not materially affected. The products obtained in accordance with my invention do not ordinarily possess sweetish tastes, but rather have bland tastes characteristic of refined oils; thus it will be evident that my invention is not merely a sweetening treatment, but rather involves a removal of the constituents of the fat-soluble vitamin-containing materials which produce undesirable tastes and odors therein.

Any fat-soluble vitamin-containing material having an undesirable taste and odor may be treated in accordance with my invention; thus materials containing vitamins A, D, E, or K, such as, for example, cod liver oil, halibut liver oil, sword fish liver oil, tuna liver oil, shark liver oil, whale liver oil, porpoise liver oil, seal liver oil and similar oils may be treated, as well as fat-soluble vitamin concentrates obtained, for example, by saponification of a vitamin-containing oil and extraction of the unsaponifiable material. The process of my invention is particularly applicable to the refining of vitamin A or D-containing oils or vitamin D concentrates of fish origin, since treatment of such materials in accordance with my invention produces products far superior to any of those now on the market. The vitamin-containing materials to be treated in accordance with my invention should not contain any foreign metals, since the presence of such metals usually accelerates deterioration of the vitamin A or D content of the oil or concentrate at the elevated temperatures employed.

The sugar employed in accordance with my invention may be any of the mono-, di or polysaccharides known to the art; thus, for example, sugars such as sucrose, maltose, arabinose, xylose, galactose, glucose, fructose, mannose, lactose, sorbitol and the like, may be employed. I prefer to employ sugar sirups containing anywhere from 10% to 80% sugar; thus, for example, sugar sirups such as blackstrap molasses, cane molasses, honey, malt sirups, maple sirup and the like, as well as sirups prepared by dissolving suitable amounts of a sugar in an aqueous body, are preferably used. However, solid sugars may be employed in the practice of my invention as well as solutions of sugars in non-aqueous bodies such as alcohol. Alcoholic extracts of the sugars or sugar sirups may also be employed. The sugar or sugar sirup may be in either a crude or refined condition, but because of their comparative cheapness and ready availability, I prefer to employ relatively crude materials from which substances which might be deleterious to the refined material have been removed.

In carrying out the process of my invention a fat-soluble vitamin-containing material having an objectionable taste and odor may be mixed with a suitable amount of sugar, and the mixture then heated to a temperature between about 100° C. and about 200° C., preferably with agitation. The amount of sugar admixed with the vitamin-containing material may vary widely depending to some extent upon the particular sugar employed and to some extent upon the taste and odor of the vitamin-containing material to be refined. Generally it may be said that an amount of sugar varying between about 0.5% and about 20% of the weight of the vitamin-containing material is suitable. As pointed out hereinabove, it is generally preferred to add the sugar in the form of an aqueous sugar sirup containing from about 10% to about 80% of the sugar; thus the amount of sirup added to the vitamin-containing material should be regulated so that the appropriate amount of sugar will be present in the vitamin material to be refined. The temperature at which the mixture is heated is particularly important, since I have found that at temperatures below about 100° C. the undesirable taste and odor are not substantially completely removed from the fat-soluble vitamin-containing material. I prefer to heat the mixture at a temperature between about 160° C. and about 180° C. since at these temperatures optimum results are obtained. The temperature should preferably not exceed about 200° C., particularly if a vitamin A-containing material is being treated, since deterioration of the vitamin is likely to commence at such temperatures.

The heating may be conducted in an open vessel if desired; however, in order to avoid the danger of deterioration of the vitamin A content of the materials treated in accordance with my invention, the heating step is preferably carried out in the presence of an inert gas such as nitrogen or carbon dioxide. Furthermore, I have found it desirable to heat the mixture at reduced pressures, preferably at pressures below about 20 mm., since under these conditions removal of the odoriferous constituents of the oil or concentrate is accelerated. The time of heating may vary to some extent; generally between about two minutes and about one hour, e. g. between about 5 minutes and about 20 minutes, are sufficient.

In some cases it may be found that the process of my invention, while it substantially improves the odor and taste of the fat-soluble vitamin-containing materials, also imparts thereto a color somewhat darker than that possessed by the original material. This color may be easily removed by contacting the refined vitamin-containing material with a decolorizing agent such as decolorizing carbon, whereupon a light-colored product substantially free from taste and odor may be obtained.

After the fat-soluble vitamin-containing material has been heated with the sugar in accordance with my invention, the material may be cooled and separated from the sugar in any suitable manner. Thus, for example, if a fish liver oil is treated in accordance with my invention, the oil may be separated from the sugar by filtering or with the aid of a centrifuge. The vitamin-containing material may also be recovered from the cooled mass by washing the mass with water to remove water-soluble residual solid material; if desired, this washing may be conducted in the presence of a water-immiscible solvent for the vitamin-containing oil or concentrate. After the washing, the water-insoluble vitamin-containing material may be dried and the solvent, if any, removed by distillation.

The refined products of my invention possess very little, if any, of the objectionable taste and odor characteristic of the materials from which they are obtained; hence these products are eminently suitable for a variety of purposes and find particular use in the preparation of vitamin products for human consumption. These products rarely possess a sweetish taste; they ordinarily have bland tastes characteristic of refined oils or concentrates. The products of my invention are perfectly stable and may be stored or shipped as desired.

From my observations I believe that vapors liberated from the sugars heated to the temperatures employed in accordance with my invention are largely responsible for the refining action displayed by these sugars; these vapors appear to be formed as a result of partial decomposition of the sugars or of components contained in the sugars or sugar sirups. However, the solid sugars probably exert some refining action. Hence I do not wish to be confined to any particular theory with regard to the operation of my invention.

The following examples are illustrative of my invention; amounts are given in parts by weight.

Example I 100 parts of halibut liver oil containing 59,300 A units per gram and having a very fishy taste and odor were mixed with 10 parts of blackstrap molasses. The mixture was then heated at 170° C. for 10 minutes in a nitrogen atmosphere and under 10 mm. pressure. At the end of this time, the oil was permitted to cool, the cooled mass was washed with water and the top layer containing the water-insoluble oil withdrawn and dried. This oil was substantially odorless and tasteless and had practically the same vitamin A potency as the original oil.

Example II 100 parts of cod liver oil containing 1760 A units per gram and having a very fishy taste and odor were mixed with 10 parts of blackstrap molasses. The mixture was then heated at 170° C. for 10 minutes in a nitrogen atmosphere and under 10 mm. pressure. At the end of this time, the oil was permitted to cool, the cooled mass was washed with water and the top layer containing the water-insoluble oil withdrawn and dried. This oil was substantially odorless and tasteless and had practically the same vitamin A potency as the original oil.

Example III 100 parts of cod liver oil containing 1760 A units per gram and having a very fishy taste and odor were mixed with 5 parts of blackstrap molasses. The mixture was then heated at 165° C. for 10 minutes in a nitrogen atmosphere and under 10 mm. pressure. At the end of this time, the oil was permitted to cool, the cooled mass was washed with water and the top layer containing the water-insoluble oil withdrawn and dried. This oil was substantially odorless and tasteless and had practically the same vitamin A potency as the original oil.

Example IV 250 parts of crude shark liver oil containing 116,000 A units per gram were mixed with 12.5 parts of clover honey. The mixture was then heated at 150° C. for 10 minutes in a nitrogen atmosphere and under 10 mm. pressure. At the end of this time, the oil was permitted to cool and the solid material filtered therefrom. The resulting product was substantially odorless and tasteless and had practically the same vitamin A potency as the original oil.

Example V 50 parts of sole liver oil containing 392,000 A units per gram were mixed with 2.5 parts of clover honey. The mixture was then heated at 165° C. for 20 minutes in a nitrogen atmosphere and under 10 mm. pressure. At the end of this time, the oil was permitted to cool and the solid material then filtered therefrom. The resulting product was substantially odorless and tasteless and had practically the same vitamin A potency as the original oil.

Example VI 25 parts of spear fish liver oil containing 272,000 A units per gram were mixed with 2.5 parts of malt sirup. The mixture was then heated at 170° C. for 5 minutes in a carbon dioxide atmosphere and under 10 mm. pressure. At the end of this time, the oil was permitted to cool and was removed from the solid material by decantation. The resulting product was substantially odorless and tasteless and possessed practically the same vitamin A potency as the original oil.

Example VII 25 parts of halibut liver oil containing 59,000 A units per gram were mixed with 20 parts of a 15% sorbitol solution. The mixture was then heated at 170° C. for 5 minutes in a carbon dioxide atmosphere and under 10 mm. pressure. The solid material was removed by filtration, whereby a product was obtained having substantially no taste and odor and possessing practically the same vitamin A potency as the original oil.

It will be evident from the above description that my invention provides a new and effective method of preparing substantially odorless and tasteless fat-soluble vitamin-containing materials from fat-soluble vitamin-containing materials having objectionable tastes and odors. My invention will, therefore, be of great interest to those engaged in the preparation of vitamin compositions, particularly for human and animal consumption. Furthermore, while my invention is primarily directed to the refining of fat-soluble vitamin-containing materials, it is also applicable to the refining of any edible oil or fat having an objectionable taste and odor.

It is to be understood that the vitamin contents of the various oils and concentrates mentioned in the specification are given in international vitamin units.

Since certain changes in carrying out the above process and certain modifications in the compositions which embody the invention may be made without departing from its scope, it is intended that all matter contained in the above description shall be interpreted as illustrative and not in a limiting sense.

Having described my invention, what I claim as new and desire to secure by Letters Patent is:

1. A process of removing objectionable tastes and odors from fat-soluble vitamin-containing materials, which comprises heating a fat-soluble vitamin material selected from the class consisting of fish oils, fish liver oils and concentrates thereof with a sugar at a temperature between about 100° C. and about 200° C.

2. A process of removing objectionable tastes and odors from fat-soluble vitamin-containing materials, which comprises heating a fat-soluble vitamin material selected from the class consisting of fish oils, fish liver oils and concentrates thereof with a sugar at a temperature between about 160° C. and about 180° C.

3. A process of removing objectionable tastes and odors from fat-soluble vitamin-containing materials, which comprises heating a fat-soluble vitamin material selected from the class consisting of fish oils, fish liver oils and concentrates thereof with a sugar at a temperature between about 100° C. and about 200° C., said heating being carried out in an inert atmosphere.

4. A process of removing objectionable tastes and odors from fat-soluble vitamin-containing materials, which comprises heating a fat-soluble vitamin material selected from the class consisting of fish oils, fish liver oils and concentrates thereof with a sugar at a temperature between about 100° C. and about 200° C., said heating being carried out in an inert atmosphere and under reduced pressure.

5. A process of removing objectionable tastes and odors from fat-soluble vitamin-containing materials, which comprises heating a fat-soluble vitamin material selected from the class consisting of fish oils, fish liver oils and concentrates thereof with a sugar at a temperature between about 160° C. and about 180° C., said heating being carried out in an inert atmosphere and under reduced pressure.

6. A process of removing objectionable tastes and odors from fat-soluble vitamin-containing materials, which comprises heating a fat-soluble vitamin material selected from the class consisting of fish oils, fish liver oils and concentrates thereof with an aqueous sugar syrup at a temperature between about 160° C. and about 180° C., said heating being carried out in an inert atmosphere and under reduced pressure.

7. A process of removing objectionable tastes and odors from fat-soluble vitamin-containing materials, which comprises heating a fat-soluble vitamin material selected from the class consisting of fish oils, fish liver oils and concentrates thereof with an aqueous maltose syrup at a temperature between about 160° C. and about 180° C., said heating being carried out in an inert atmosphere and under reduced pressure.

8. A process of removing objectionable tastes and odors from fat-soluble vitamin-containing materials, which comprises heating a fat-soluble vitamin material selected from the class consisting of fish oils, fish liver oils and concentrates thereof with an aqueous lactose syrup at a temperature between about 160° C. and about 180° C., said heating being carried out in an inert atmosphere and under reduced pressure.

9. A process of removing objectionable tastes and odors from fat-soluble vitamin-containing materials, which comprises heating a fat-soluble vitamin material selected from the class consisting of fish oils, fish liver oils and concentrates thereof with an aqueous sucrose syrup at a temperature between about 160° C. and about 180° C., said heating being carried out in an inert atmosphere and under reduced pressure.

10. A process of removing objectionable tastes and odors from fat-soluble vitamin-containing materials, which comprises heating a fat-soluble vitamin material selected from the class consisting of fish oils, fish liver oils and concentrates thereof with black strap molasses at a temperature between about 160° C. and about 180° C., said heating being carried out in an inert atmosphere and under reduced pressure.

11. A process of removing objectionable tastes and odors from fat-soluble vitamin-containing materials, which comprises heating a fat-soluble vitamin material selected from the class consisting of fish oils, fish liver oils, and concentrates thereof with an aqueous sugar syrup at a temperature between about 100° C. and about 200° C.

12. A process of removing objectionable tastes and odors from fat-soluble vitamin-containing materials, which comprises heating a fat-soluble vitamin material selected from the class consisting of fish oils, fish liver oils and concentrates thereof with an aqueous sugar syrup at a temperature between about 100° C. and about 200° C., said heating being carried out under reduced pressure.

13. A process of removing objectionable tastes and odors from fat-soluble vitamin-containing materials, which comprises heating a fat-soluble vitamin material selected from the class consisting of fish oils, fish liver oils and concentrates thereof with an aqueous sugar syrup at a temperature between about 100° C. and about 200° C., said heating being carried out in an inert atmosphere and under reduced pressure.

LORAN O. BUXTON.